(12) United States Patent
Sekido et al.

(10) Patent No.: US 8,741,198 B2
(45) Date of Patent: Jun. 3, 2014

(54) PROCESS FOR PRODUCING FIBER REINFORCED RESIN

(75) Inventors: Toshihide Sekido, Shiga (JP); Hidehiro Takemoto, Ehime (JP); Seiji Tsuji, Ehime (JP); Shintaro Tanaka, Aichi (JP)

(73) Assignee: Toray Industries, Inc. (JP)

( * ) Notice: Subject to any disclaimer, the term of this patent is extended or adjusted under 35 U.S.C. 154(b) by 657 days.

(21) Appl. No.: 12/281,785

(22) PCT Filed: Mar. 1, 2007

(86) PCT No.: PCT/JP2007/053913
§ 371 (c)(1),
(2), (4) Date: Sep. 5, 2008

(87) PCT Pub. No.: WO2007/102395
PCT Pub. Date: Sep. 13, 2007

(65) Prior Publication Data
US 2009/0202826 A1 Aug. 13, 2009

(30) Foreign Application Priority Data
Mar. 8, 2006 (JP) .................................. 2006-062432

(51) Int. Cl.
*B29C 45/14* (2006.01)
*B32B 37/00* (2006.01)

(52) U.S. Cl.
USPC ........... 264/258; 264/510; 264/546; 264/552; 264/261; 264/263; 264/271.1; 264/273; 264/279; 264/328.2

(58) Field of Classification Search
USPC .......................................... 264/258, 263, 316
See application file for complete search history.

(56) References Cited

U.S. PATENT DOCUMENTS

| | | | | |
|---|---|---|---|---|
| 4,539,253 | A * | 9/1985 | Hirschbuehler et al. | 442/239 |
| 5,396,932 | A * | 3/1995 | Homma et al. | 139/420 A |
| 5,403,537 | A * | 4/1995 | Seal et al. | 264/511 |
| 5,580,412 | A * | 12/1996 | Fantino | 156/285 |
| 5,721,034 | A * | 2/1998 | Seemann et al. | 428/71 |
| 5,778,735 | A * | 7/1998 | Groves et al. | 74/572.12 |
| 6,037,035 | A * | 3/2000 | Bottger | 428/116 |
| 6,203,749 | B1 * | 3/2001 | Loving | 264/510 |
| 6,265,333 | B1 * | 7/2001 | Dzenis et al. | 442/346 |

(Continued)

FOREIGN PATENT DOCUMENTS

| | | |
|---|---|---|
| JP | 7-100847 A | 4/1995 |
| JP | 2000-43172 A | 2/2000 |

(Continued)

*Primary Examiner* — Jeffrey Wollschlager
(74) *Attorney, Agent, or Firm* — DLA Piper LLP (US)

(57) ABSTRACT

A process for producing a fiber reinforced resin which comprises placing at least a reinforcing fiber substrate in a cavity of a mold, injecting a resin into the cavity, and curing the resin, characterized in that a substrate for forming a skin layer, and a resin distribution medium, which is located between the substrate for forming the skin layer and the reinforcing fiber substrate and in which the ratio of the coefficient of impregnation thereof to that of the substrate for forming the skin layer is 1.5-10, are disposed on at least one surface of the reinforcing fiber substrate via an interlayer having a cover factor of 90%-100% and comprising at least one woven fabric. The process diminishes pinhole generation in the skin layer in RTM, and can reduce the necessity of a repair step in, e.g., a painting step as a later step, thereby improving productivity.

12 Claims, 3 Drawing Sheets

(56) References Cited

U.S. PATENT DOCUMENTS

| | | | |
|---|---|---|---|
| 7,048,985 B2 * | 5/2006 | Mack et al. | 428/111 |
| 7,060,156 B2 * | 6/2006 | Mack et al. | 156/285 |
| 7,358,202 B2 * | 4/2008 | Hartman et al. | 442/246 |
| 7,579,292 B2 * | 8/2009 | Mack et al. | 442/312 |
| 2003/0102604 A1 * | 6/2003 | Mack et al. | 264/511 |
| 2004/0185733 A1 * | 9/2004 | Murai et al. | 442/265 |
| 2005/0059309 A1 * | 3/2005 | Tsotsis | 442/381 |

FOREIGN PATENT DOCUMENTS

| | | |
|---|---|---|
| JP | 2002-192535 A | 7/2002 |
| JP | 2004-299178 A | 10/2004 |
| JP | 2005-232601 A | 9/2005 |
| JP | 2005-271248 A | 10/2005 |

\* cited by examiner

PROCESS FOR PRODUCING FIBER REINFORCED RESIN

RELATED APPLICATIONS

This is a §371 of International Application No. PCT/JP2007/053913, with an international filing date of Mar. 1, 2007 (WO 2007/102395 A1, published Sep. 13, 2007), which is based on Japanese Patent Application No. 2006-062432, filed Mar. 8, 2006.

TECHNICAL FIELD

The present invention relates to a process for producing a fiber reinforced resin (hereinafter, also referred to as "FRP" (Fiber Reinforced Plastic)), and specifically, to a process for producing a fiber reinforced resin due to RTM (Resin Transfer Molding).

Where, the RTM in the present invention includes an RTM method wherein a mold comprising a pair of divided upper and lower molds is used, a resin is injected at a pressurized condition from a resin injection port toward a resin discharge port, and after air in the mold is extruded by the resin, the mold is closed and the resin in the mold is pressurized and cured, an RTM method wherein, after an inside of a mold is turned into a vacuum condition, a resin is injected by suction or pressurization, and cured, and a vacuum RTM method wherein a substrate is placed on a one surface mold, the substrate is covered with a bagging material such as a film, and after the inside is reduced in pressure, a resin is sucked and injected by the vacuum pressure in the inside.

BACKGROUND

An FRP is utilized in very broad fields as a composite material having light-weight and high mechanical properties. As one method for molding such an FRP, RTM method is widely employed. In the RTM method, although the molding cycle time is relatively short, there is a case where defects called pinholes, voids, etc. remain on a surface of a molded product by a bad resin flow and the like, and in a case where the method is applied to production of a product requiring a good appearance, a surface repair step and the like is required before a painting step. From such a matter, an FRP produced by an RTM method requires time and labor for finishing the appearance, and is liable to become an expensive product.

Accordingly, various investigations have been carried out to solve such problems in the conventional RTM method. For example, Patent document 1 proposes a molding method wherein a laminated material comprising a surface layer forming material/a separation substrate with a great filtration resistance/a fibrous reinforcing material/a separation substrate with a small filtration resistance/foamable resin particles is placed in a mold used for RTM, the molding temperature is elevated, the surface layer substrate is pressed to the mold by expansion in volume of the foamable particles, and thereinto a liquid resin for molding is injected, thereby obtaining a composite molded product with a high surface quality. In this method, however, there are problems such as a problem that, because it is required to prevent the foamable particles from flowing out to the surface layer by the separation substrate with a great filtration resistance, the lamination structure is restricted, and a problem that, in order to prevent a deformation of a molded product ascribed to the inner pressure of the foamed particles after heating up to the foaming temperature of the foamable particles and molding, the temperature of the mold must be enough lowered after the liquid resin is cured, and therefore, the device increases in scale and the molding cycle time becomes long.

Further, Patent document 2 proposes a molding method wherein a random mat layer is provided just under a reinforcing fiber substrate forming a surface layer in lamination, thereby extracting bubbles from the reinforcing fiber substrate and accelerating the impregnation of resin into the reinforcing fiber substrate of the surface layer. In this method, however, because the random mat layer is disposed just under the surface substrate, bubbles contained in resin stay in the random mat layer, and there is a case where through pinholes are generated in the upper surface substrate.

Patent document 1: JP-A-7-100847
Patent document 2: JP-A-2005-232601

It could therefore be helpful to improve productivity of a molded product by diminishing surface defects such as pinholes which have been generated on a surface layer in the conventional RTM method and reducing necessity of a repair step such as a painting step as a later step.

SUMMARY

As the result of various investigations that have been carried out in order to solve the above-described problems, it has been found that an RTM molded product having almost no pinholes on its surface and excellent in surface quality can be obtained by providing an interlayer with a specified cover factor and a resin distribution layer with a specified impregnation property, and the present invention has been completed.

Namely, a process for producing a fiber reinforced resin according to the present invention is a process which comprises placing at least a reinforcing fiber substrate in a cavity of a mold, injecting a resin into said cavity, and curing said resin (namely, a process for producing a fiber reinforced resin by an RTM method), is characterized in that a substrate for forming a skin layer, and a resin distribution medium, which is located between the substrate for forming the skin layer and the reinforcing fiber substrate and in which a ratio of a coefficient of impregnation thereof to that of the substrate for forming the skin layer is 1.5-10, are disposed on at least one surface of the reinforcing fiber substrate via an interlayer having a cover factor of 90%-100% and comprising at least one woven fabric.

In such an RTM method in the present invention, by disposing the specified interlayer and resin distribution medium in the lamination structure, first, bubbles mixed accompanying with resin injection are flowed in the resin distribution medium with a good resin flowability together with resin, and the bubbles can be well discharged or can be stayed in the resin distribution medium layer, and further, by providing the interlayer having a cover factor in a specified range between an outermost layer and the resin distribution medium, the bubbles staying in the resin distribution medium can be prevented from being exposed to the surface of the molded product. On the other hand, the resin is retained in the resin distribution medium and the resin having less bubbles can be supplied from the resin distribution medium to a surface side substrate and the impregnation thereof can be progressed, and therefore, a molded product, in which defects on a design surface such as voids or pinholes are generated very rarely, can be molded efficiently and stably in a short time, that has been difficult in the conventional RTM method.

In the process for producing a fiber reinforced resin according to the present invention, an embodiment can be employed wherein at least one end portion of the resin distribution medium is extended outward longer than at least one adjacent layer. By extending at least one end portion of the resin distribution medium longer than at least one adjacent layer, the injected resin can be easily entered and distributed from the end portion formed longer into the resin distribution medium, and the resin can be surely supplied into the layer of the resin distribution medium. As a result, the resin is distributed surely into the inside of the laminate, and the resin impregnation property relative to the entire of the laminate can be greatly improved.

It is preferred that the coefficient of impregnation of the resin distribution medium is $1\times10^{-10}$ $m^2$ or more. The coefficient of impregnation is a coefficient representing the easiness of the impregnation of the resin, and the determination method thereof will be described later. By using a resin distribution medium with a high coefficient of impregnation, the distribution of the resin to a desired region can be facilitated and the impregnation property of the distributed resin can also be improved, and the advantage due to the above-described end portion formed longer can be exhibited better.

Further, it is preferred that the thickness of the resin distribution medium is in a range of 200-2,000 μm. Because it is preferred that the resin distribution medium has a high coefficient of impregnation as described above, by using a medium with such a high coefficient of impregnation, it becomes possible to flow a sufficiently large amount of resin from the end portion of the resin distribution medium toward a central portion or an opposite side end portion thereof. However, if the resin distribution medium is too thin, it becomes difficult to flow a sufficiently large amount of resin, and on the contrary, if too thick, it becomes difficult to maintain a desirable formation of lamination as the whole of the laminate. Therefore, the thickness is preferably in a range of 200-2,000 μm.

In consideration of the above-described preferable coefficient of impregnation and thickness, it is preferred that a mesh is used as the resin distribution medium.

Further, in the process for producing a fiber reinforced resin according to the present invention, an embodiment can be employed wherein a core material is placed on at least one surface side of the resin distribution medium, and a resin flowable substrate with a thickness of 50-2,000 μm is provided at least at an end portion of resin injection side of the core material. This resin flowable substrate may be disposed only at the end portion of the core material, and it is not necessary that it extends over the entire surface of the core material. Further, although the resin flowable substrate may be disposed at least at one end portion in the resin flow direction, desirably it is disposed each end portion. By such a condition where a specified resin flowable substrate layer is thus disposed at an end portion of the core material, the resin flow becomes very stable at the end portion of the core material, bubbles, which have been liable to reach the surface of a molded material in the conventional technology, are enclosed in the molded material at a condition being dispersed finely, and they become hard to be exposed to the surface. Consequently, the surface quality of the molded material is greatly improved.

In this resin flowable substrate, the coefficient of impregnation thereof is preferably $1\times10^{-10}$ $m^2$ or more. Namely, by employing a resin flowable substrate with a high coefficient of impregnation, the above-described advantages for stabilizing the resin flow and dispersing and enclosing the bubbles can be increased more greatly.

Further, it is also preferred that grooves are processed on at least one surface of the core material. By the existence of the core grooves, because the resin distributed by the resin distribution medium can be distributed more quickly and more uniformly, together with the operation due to the resin flowable substrate disposed at the end portion of the core material, it is avoided that bubbles stay or grow locally, and a more uniform molding becomes possible.

Thus, in the process for producing a fiber reinforced resin according to the present invention, by disposing the specified interlayer and resin distribution medium in the lamination structure, it can be effectively prevented that bubbles staying in the resin distribution medium layer are exposed to the surface of a molded product, a molded product, in which defects on its surface such as voids or pinholes are generated very rarely, can be molded efficiently and stably in a short time. As a result, even in a production process having a painting step as a later step, the step for surface repair can be omitted or reduced greatly, and a molded product at a low cost can be obtained.

EXPLANATION OF SYMBOLS

Figure 1:
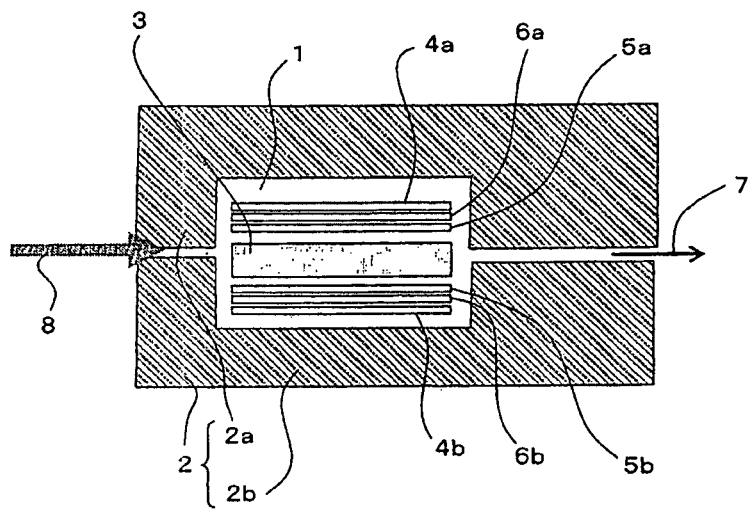
FIG. 1 is a schematic diagram showing an example of a basic embodiment of a process for producing a fiber reinforced resin according to the present invention.

1: cavity
2: upper mold
2b: lower mold
3: reinforcing fiber substrate
4a, 4b: substrate for forming skin layer
5a, 5b: resin distribution medium
6a, 6b: interlayer
11: device for determining coefficient of impregnation
12: resin tank
13: vacuum pump
14: substrate
15: injection port
16: discharge port
17: direction of impregnation
21: resin distribution medium
22a, 22b: adjacent layer
31: core material
32: resin distribution medium
33: resin flowable substrate
34: interlayer
35: substrate for forming skin layer
36: groove
41: cavity
42: lower mold 43: seal material
44: injection port
45: discharge port
51a: substrate for forming skin layer
51b: substrate of interlayer
51c: substrate of resin distribution medium
51d: reinforcing fiber substrate
61a: substrate for forming skin layer
61b: substrate of interlayer
61c: substrate of resin distribution medium
61d: reinforcing fiber substrate
61e: core material
71: molded product
72a: position for determining thickness of central part of end portion
71b: position for determining thickness of central part

DETAILED DESCRIPTION

Hereinafter, the present invention will be explained in detail together with desirable embodiments.

FIG. 1 shows an example of a basic embodiment of a process for producing a fiber reinforced resin according to the present invention. A reinforcing fiber substrate 3 is placed in a cavity 1 of a mold 2 comprising an upper mold 2a and a lower mold 2b, and in this embodiment, on each surface side of the reinforcing fiber substrate 3, a substrate for forming a skin layer 4a, 4b, and a resin distribution medium 5a, 5b, which is located between the skin layer forming substrate 4a, 4b and the reinforcing fiber substrate 3 and in which a ratio of a coefficient of impregnation thereof to that of the skin layer forming substrate 4a, 4b is 1.5-10, are disposed via an interlayer 6a, 6b having a cover factor of 90%-100% and comprising a woven fabric. At this condition, the inside of cavity 1 is reduced in pressure, for example, by vacuum suction as shown by arrow 7, a resin is injected into the cavity 1 reduced in pressure as shown by arrow 8, the injected resin is cured, for example, by heating after being impregnated into the substrate in the cavity 1, and thus, a predetermined molded product of fiber reinforced resin is produced.

As the resin used in the present invention, for example, a thermosetting resin such as an epoxy resin, a vinylester resin, an unsaturated polyester resin or a phenolic resin, an acrylic resin, a polyamide resin, a polyolefin resin, etc. can be exemplified. In particular, a resin having a low viscosity such as 10 Pa-s or less as a viscosity at room temperature and good in impregnation into fibers is preferred.

The reinforcing fiber substrate in the present invention is used as a generic term of a substrate comprising reinforcing fibers except a substrate for forming a skin layer, a substrate for an interlayer and a substrate for a resin distribution medium described later. As the reinforcing fibers used for the reinforcing fiber substrate in the present invention, for example, carbon fibers, glass fibers, aramide fibers, PBO (polyparaphenylene benzobisoxazole) fibers, tirano (titanium-alumina) fibers, nylon fibers, etc. can be exemplified. Further, as the weave structure, any of a woven fabric and a non-woven fabric can be employed, and in a case of a woven fabric, plain weave, twill weave, satin weave, etc. can be exemplified, and it may be a weave structure formed not only from one kind of fibers but also from a plurality of kinds of fibers. In a case of a non-woven fabric, for example, a random mat, a continuous strand mat, etc. can be exemplified.

The surface layer forming substrate in the present invention is a substrate disposed as an outermost layer of a molded product and a substrate satisfying the ratio of the coefficient of impregnation thereof to that of the resin distribution medium described later. As the fibers used for the surface layer forming substrate in the present invention, for example, carbon fibers, glass fibers, aramide fibers, PBO (polyparaphenylene benzobisoxazole) fibers, tirano (titanium-alumina) fibers, nylon fibers, etc. can be exemplified. Further, as the weave structure, any of a woven fabric and a non-woven fabric can be employed, and in a case of a woven fabric, plain weave, twill weave, satin weave, etc. can be exemplified, and it may be a weave structure formed not only from one kind of fibers but also from a plurality of kinds of fibers. In a case of a non-woven fabric, for example, a random mat can be raised.

The resin distribution medium in the present invention is a layer having a coefficient of impregnation higher than those of other substrates so as to enable the resin in the resin distribution medium layer to easily flow, and a substrate satisfying the ratio of the coefficient of impregnation thereof to that of the surface layer forming substrate described later.

For forming this resin distribution medium, a mesh or a fibrous substrate can be used. As the material of the mesh, for example, a nylon resin, a polypropylene resin, a poly-ethylene resin, etc. can be exemplified, and in accordance with requirements, a material enhanced in adhesive property by a plasma treatment or a corona treatment may be used. In a case using a fibrous substrate, as the fibers used therefor, for example, carbon fibers, glass fibers, aramide fibers, PBO (polyparaphenylene benzobisoxazole) fibers, tirano (titanium-alumina) fibers, nylon fibers, etc. can be exemplified. Further, as the weave structure, any of a woven fabric and a non-woven fabric can be employed, and in a case of a woven fabric, plain weave, twill weave, satin weave, etc. can be exemplified, and it may be a weave structure formed not only from one kind of fibers but also from a plurality of kinds of fibers. In a case of a non-woven fabric, for example, a random mat, a continuous strand mat, etc. can be exemplified.

The interlayer in the present invention is a woven-fabric substrate whose cover factor is high to be 90%-100% so as to prevent bubbles in the resin flowing in the resin distribution medium from reaching an outer layer.

As the fibers used for the woven-fabric substrate of this interlayer, for example, carbon fibers, glass fibers, aramide fibers, PBO (polyparaphenylene benzobisoxazole) fibers, tirano (titanium-alumina) fibers, nylon fibers, etc. can be exemplified. Further, as the structure of the substrate, a woven fabric is preferred, plain weave, twill weave, satin weave, etc. can be exemplified, and it may be a weave structure formed not only from one kind of fibers but also from a plurality of kinds of fiber.

In the present invention, the surface layer forming substrate and the resin distribution medium are formed as substrate layers different in coefficient of impregnation from each other, and it is necessary that the ratio between those impregnation coefficients is 1.5-10 in order to obtain an appearance less in defects on the surface after molding such as hole-like defects called as pinholes having a diameter of 0.2 mm or more and 2 mm or less and a depth of 0.2 mm or more and 1 mm or less. In a case where this ratio of impregnation coefficients is lower than 1.5, a difference between resin flows substantially does not occur, the resin containing bubbles flows also to the surface layer forming substrate, and pinholes are likely to be formed on the surface for forming the appearance. Further, in a case where the ratio of impregnation coefficients is higher than 10, although the pinholes on the surface for forming the appearance are less formed, because the amount of resin impregnation increases, there may be a case where the weight of the molded product increases.

Ratio between impregnation coefficients=$K1/K2$ where,
- K1: largest coefficient of impregnation of substrate among the laminated structure (coefficient of impregnation of the resin distribution medium layer)
- K2: smallest coefficient of impregnation of substrate among the laminated structure Where, the coefficient of resin impregnation means a value determined by the following determination method.

In the impregnation step of resin, it is known that the behavior of the resin being impregnated into a substrate is based on Darcy's law shown in the following equation, and the impregnation speed is determined by the following equation:

$$v=(K/\mu)\times(\Delta P/\Delta L) \quad (1)$$

where, v (m/s) is an impregnation speed, K (m²) is a coefficient of impregnation, μ is a resin viscosity (Pa·s), and ΔP (Pa)/ΔL (m) is a pressure gradient per unit length. By integrating this equation with time t (s), the coefficient of impregnation can be determined by the following equation:

$$K=(L\times L\times\mu)/(2\times P\times t) \quad (2)$$

where, L (m) is a distance from a resin injection port to a flow front (tip of flowed resin). From the equation (2), if the distance from the resin injection port to the flow front and the time reaching there, the resin viscosity and the molding pressure are recognized, the coefficient of impregnation can be calculated. Therefore, in the determination of the coefficient of impregnation, as one example, using a device as shown in FIG. 2, the test for determining the coefficient of impregnation as to a basic form such as a flat-plate form is carried out, and the coefficient of impregnation K can be determined by determining these data.

Figure 2:
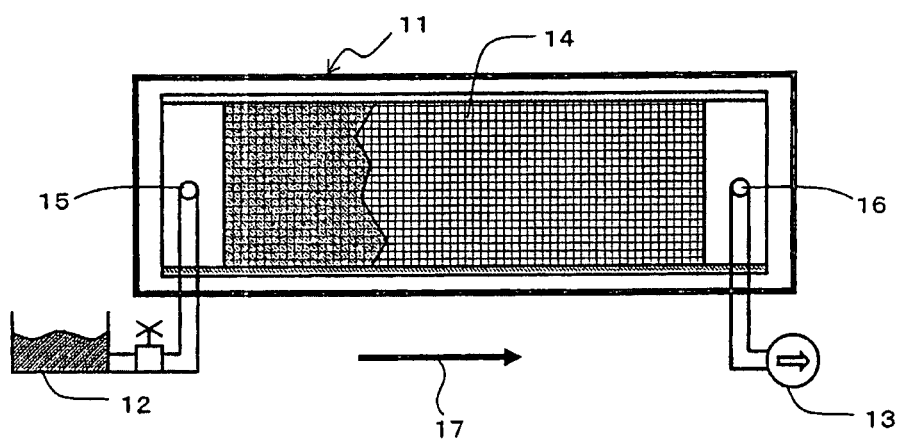
FIG. 2 is a schematic diagram of a device for determining a coefficient of impregnation.

When the coefficient of impregnation is determined in the present invention, for example, a device for determining a coefficient of impregnation 11, as shown in FIG. 2, is used. The pressure ΔP is set at 100 kPa by keeping the inside of this device 11 at a pressure higher in vacuum degree than −100 kPa at a gauge pressure. Further, in the determination, although it is preferred that the determination is carried out in the molding temperature using an actual resin, if the resin viscosity under the molding temperature is known in advance, the determination may be carried out using a liquid with a viscosity controlled at the resin viscosity, for example, using a silicone oil, an ether group synthetic oil, etc. Where, in the present invention, the distance L from the resin injection port to the flow front is set at 500 mm, and at this condition, the time t for reaching of the resin is measured by a digital type stop watch capable of measuring the time at 1/100 sec. Further, in the determination, the coefficient of impregnation is calculated as an average value of three measurement. In FIG. 2, symbol 12 indicates a resin tank symbol 13 indicates a vacuum pump, symbol 14 indicates a substrate, symbol 15 indicates an injection port, symbol 16 indicates a discharge port, and arrow 17 indicates a direction of resin impregnation, respectively.

As the woven fabric substrate used for the interlayer in the present invention, a substrate having a cover factor of 90%-100% is used. By disposing one or more layers of substrates with a cover factor of 90% or more as the interlayer, bubbles are hardly flowed out from the resin distribution medium to the surface layer forming substrate, and a molded product with less pinholes on the appearance can be obtained.

Where, the cover factor indicates a rate of fiber area occupied relative to a unit area, and in a case where the substrate is a woven fabric, it is determined in the following manner. The image of the substrate to be determined is enlarged by a copy machine and the like, and the warp-direction dimension Y and the weft-direction dimension X per 10 fiber bundles are measured. At that time, the enlargement in the copy machine is carried out so that the dimension per 10 fiber bundles becomes 100±5 mm, and the measurement is carried out using a calipers capable of indicating at a unit of 0.01 mm. Next, the width of each of the 10 fiber bundles is measured at 3 points of each fiber bundle determined at a pitch of X/2 for the warp, totally 30 points for the 10 fiber bundles, and at 3 points of each fiber bundle determined at a pitch of Y/2 for the weft, totally 30 points for the 10 fiber bundles, and the average value x of the widths of the warps and the average value y of the widths of the wefts are calculated. The cover factor Cf is represented by the following equation:

$$Cf=\{Y^*x+(X-x)^*y)\}/(X^*Y).$$

The thickness of the resin distribution medium used in the present invention is preferably in a range of 200-2,000 μm from the viewpoint of obtaining a molded product with a good appearance. If less than 200 μm, the passing of bubbles in the resin is obstructed and void stay is liable to be formed near a resin injection port, and if more than 2,000 μm, although voids capable of being accumulated in the layer can be increased, the weight as a molded product increases and the advantage of lightening in weight is not expected. Where, in order to obtain a resin distribution medium having such a thickness, for example, in a case using a glass fiber mat, it can be realized by employing a mat with a weight of 200-900 g/m² (this weight may be achieved by a plurality of mats). The resin distribution medium may be formed by only one layer in the material to be molded or may be formed by a plurality of layers, as long as the above-described thickness is satisfied.

Further, by setting the coefficient of impregnation of the substrate used for the resin distribution medium layer at $1\times10^{-10}$ m² or more, for example, in a range of $1\times10^{-10}$ to $1\times10^{-9}$ m², the resin flows mainly in the resin distribution medium layer and bubbles and the like in the resin, which may give a bad influence to the appearance, can easily stay in this resin distribution medium layer, and therefore, it becomes possible to obtain a molded product having a good appearance. From such a viewpoint, although the upper limit of the coefficient is preferred as high as possible, the above-described range can be raised as one capable of being actually obtained in the present situation. Further, in a case where a substrate with a higher coefficient of impregnation could be obtained in the future, it would be possible to apply it preferably.

Furthermore, as the form of the material used for the resin distribution medium, as aforementioned, any of a mesh, a woven fabric and a non-woven fabric may be employed, but, for example, if a non-woven fabric such as a glass fiber chopped mat or continuous strand mat is used, a low-cost molded product can be realized, and further, it becomes easier to accumulate voids in the layer.

Figure 3:
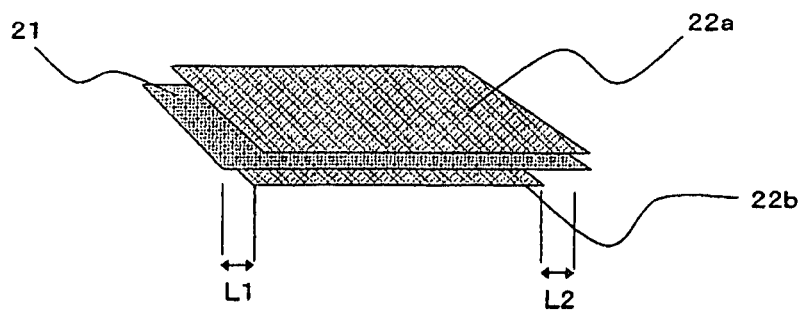
FIG. 3 is a schematic diagram showing an example of a case where an end portion of a resin distribution medium is extended in a process for producing a fiber reinforced resin according to the present invention.

Further, in the present invention, an embodiment may be employed wherein at least one end portion of the resin distribution medium is extended outward longer than at least one adjacent layer. The resin distribution medium may be extended at both end portions, a combination of different forms, different from each other in extended form at each end portion or in relationship with an adjacent layer, may be employed. For example, as shown in FIG. 3, a form can be employed wherein one end portion of resin distribution medium 21 is projected from both adjacent layers 22a, 22b and the other end portion is projected only from adjacent layer 22b. L1 and L2 represent respective projection lengths of resin distribution medium 21, and the medium may be extended outward longer than at least one adjacent layer. This projection length is desirably 1 mm or more, and preferably in a range of 1 mm to 30 mm. By thus extending at least one end portion of the resin distribution medium longer than at least one adjacent layer, the injected resin is easily entered and progressed into the resin distribution medium from the longly formed end portion, and the resin can be supplied into the layer of the resin distribution medium more surely.

Figure 4:
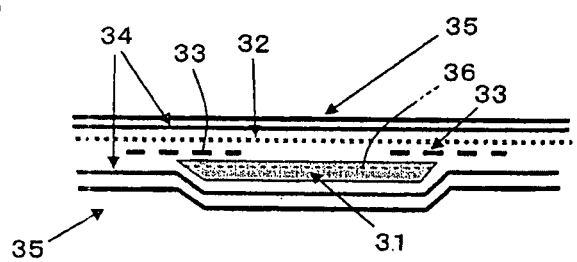
FIG. 4 is a schematic diagram showing an example of a case where a resin flowable substrate is provided at an end portion of a core material in a process for producing a fiber reinforced resin according to the present invention.

Further, in a case where a core material is disposed on at least one surface side of the resin distribution medium, there is a fear that bubbles are likely to reach the surface of a material to be molded from the end portion of the core material. Accordingly, in the present invention, as shown in FIG. 4 for example, it is preferred that a resin flowable substrate 33 having a thickness of 50-2,000 μm is provided between a core material 31 and a resin distribution medium 32 on the end portion of at least the resin injection side of the core material 31 (in the figure, on both end portions). This resin flowable substrate 33 may be disposed only on the end portion of core material 31, and it is not necessary to be extended over the entire surface of the core material 31. By disposing such a specified resin flowable substrate 33 on the end portion of core material 31, the resin flow is extremely stabilized at the end portion of core material 31, bubbles, which have been likely to reach the surface of the material to be molded from this portion, are enclosed in the molded material after being dispersed finely, and they are hard to be exposed to the surface. As a result, the surface quality of the molded material can be greatly improved. Where, in FIG. 4, symbol 34 indicates an interlayer, and symbol 35 indicates a substrate for forming a surface layer, respectively.

As aforementioned, the coefficient of impregnation of the above-described resin flowable substrate 33 is preferably $1 \times 10^{-10}$ m$^2$ or more. Further, it is also preferred that a groove 36 is processed on at least one surface of the above-described resin flowable substrate 33. By the existence of the groove 36, the resin distributed by resin distribution medium 32 can be distributed more quickly and more uniformly.

Thus, in the process for producing a fiber reinforced resin according to the present invention, since a formation is employed wherein bubble components present in the resin are passed mainly through the resin distribution medium layer and the bubbles hardly reach the surface side of the molded material by the specified interlayer, the necessity of a later step such as a repair step is reduced, and it becomes possible to obtain a fiber reinforced resin molded product excellent in surface quality in which there are almost no pinholes on the appearance.

The fiber reinforced resin thus obtained can be made as a carbon fiber reinforced plastic (CFRP) excellent in light weight property, high strength, high elastic modulus and impact resistance by using carbon fibers as the reinforcing fibers, and it can be used as a CFRP member suitable for automobiles, structural materials for airplanes, structural materials for ships, shafts for golf clubs, ski boards, fishing rods, etc. Where, for the CFRP member, reinforcing fibers (for example, glass fibers, aramide fibers, PBO (polyparaphenylene benzobisoxazole) fibers, tirano (titanium-alumina) fibers, nylon fibers, etc.) other than carbon fibers may be contained as long as the light weight property, high strength, high elastic modulus and impact resistance are not damaged, and if the content of the reinforcing fibers other than carbon fibers is less than 50 mass % relative to the whole of reinforcing fibers, a member with such a condition is included in the CFRP member described here. Further, the CFRP member is preferably used particularly as a member for an automobile to which a mass production at a short-time molding cycle is required.

EXAMPLES

Hereinafter, the present invention will be explained more concretely based on examples.

The materials used in the examples are as follows:

Substrate (a): carbon fiber woven fabric, "CO6343B" produced by Toray Industries, Inc. (weave structure: plain weave, weight of woven fabric: 198 g/m$^2$, reinforcing fiber: T300B-3K, elastic modulus: 230 GPa, strength: 3,530 MPa, size: 198 tex, number of filaments: 3,000), cover factor=95-97%

Substrate (b): carbon fiber woven fabric, "BT70-30" produced by Toray Industries, Inc. (weave structure: plain weave, weight of woven fabric: 317 g/m$^2$, reinforcing fiber: T700SC-12K, elastic modulus: 230 GPa, strength: 4,900 MPa, size: 800 tex, number of filaments: 12,000), cover factor=96-98%

Substrate (c): carbon fiber woven fabric, "BT70-20" produced by Toray Industries, Inc. (weave structure: plain weave, weight of woven fabric: 214 g/m$^2$, reinforcing fiber: T700SC-12K, elastic modulus: 230 GPa, strength: 4,900 MPa, size: 800 tex, number of filaments: 12,000), cover factor=93-96%

Substrate (d): glass fiber surface mat, "MF30P100BS6" produced by Nitto Boseki Co., Ltd. (fabric form: continuous fiber non-woven fabric, weight: 30 g/m$^2$)

Substrate (e): carbon fiber mat, short fiber mat of "TORAYCA" (registered trade mark) "T700SC" produced by Toray Industries, Inc. (elastic modulus: 230 GPa, strength: 4,900 MPa, size: 1,650 tex) (cut length: maximum 2 inch, weight: 80 g/m$^2$)

Substrate (f): continuous strand mat, produced by Nippon Sheet Glass Co., Ltd. (fabric form: glass continuous fiber non-woven fabric, weight: 450 g/m$^2$)

Substrate (g): mesh sheet "NNB20" (produced by NBC Corporation: nylon mesh, thickness: 520 μm)

Substrate (h): glass woven fabric, "10T" produced by Unitika Glass Fiber Corporation (weight: 106 g/m$^2$, weave density: warp 60/25 mm, weft=58/25 mm)

Substrate (i): glass fiber non-woven fabric, "SUPER WOOL MAT" "YWN-8" produced by Yazawa Sangyo Corporation (fabric form: felt-like non-woven fabric, weight: 720 g/m$^2$)

Substrate (a'): substrate prepared by adhering epoxy modified thermoplastic resin having a melting point of 71° C. to substrate (a) at an amount of 10±3 g/m$^2$ in advance Substrate (b'): substrate prepared by adhering epoxy modified thermoplastic resin having a melting point of 71° C. to substrate (b) at an amount of 5±3 g/m$^2$ Substrate (c'): substrate prepared by adhering epoxy modified thermoplastic resin having a melting point of 71° C. to substrate (c) at an amount of 5±3 g/m$^2$ Core material (a): "FOAMAC" HR#1006 produced by Sekisui Chemical Co., Ltd. (thermally resistant acrylic resin foamed material), density: 0.1 g/cm$^3$, thickness: 6 mm Resin (a): epoxy resin TR-C35 produced by Toray Industries, Inc.

Main component: "EPIKOTE" 828 (produced by Yuka Shell Epoxy Corporation, epoxy resin)

Curing agent: blend TR-C35H produced by Toray Industries, Inc. (imidazole derivative)

Mixing ratio: main component:curing agent=10:1

Resin viscosity at 100° C.: 17 mm Pa-s (value by determining viscosity at 30° C., 50° C. and 70° C. using an E-type viscometer, and converting the determined viscosity based on WLF equation [Williams-Landel-Ferry Equation])

Example 1

Figure 5:
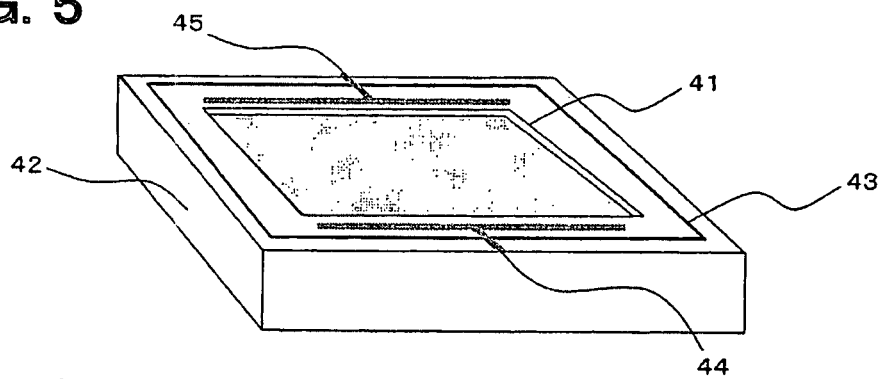
FIG. 5 is a perspective view of a lower mold used in Example 1.
Figure 6:
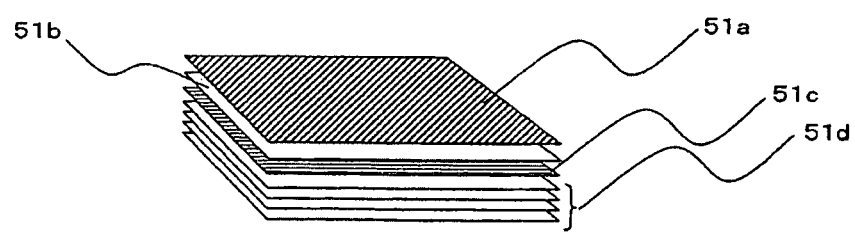
FIG. 6 is a schematic perspective view showing a lamination structure of substrates used in Example 1.

Reinforcing fiber substrates, etc. (51a, 51b, 51c, 51d) shown in FIG. 6 were placed on a lower mold 42 of molding having a cavity 41 with a size of 480 mm×480 mm and having a shape shown in FIG. 5, an upper mold (not shown) was closed while being sealed with a seal material 43. The respective substrates of reinforcing fibers, etc. used here are as follows:
  Surface layer forming substrate 51a:
    substrate (a) (0°/90° fiber orientation)×1 ply
  Substrate for interlayer 51b:
    substrate (a) (0°/90° fiber orientation)×1 ply
  Substrate for resin distribution medium layer 51c:
    substrate (f)×1 ply
  Reinforcing fiber substrate 51d:
    substrate (a) (0°/90° fiber orientation)×2 ply The coefficients of impregnation of substrate (a) and substrate (f) were determined by the device shown in FIG. 2. The determination was carried out using a liquid having almost the same viscosity at 25° C. as the viscosity of resin (a) at a molding temperature of 100° C., and the following values were obtained:
  Coefficient of impregnation K of substrate (a)=$0.6 \times 10^{-10}$ m$^2$
  Coefficient of impregnation K of substrate (f)=$3.1 \times 10^{-10}$ m$^2$ Therefore, the ratio of the coefficients of impregnation at that time was 5.2.

Next, the lower mold 42 and the upper mold for molding were held at a temperature of 100° C., and at a state being kept at a vacuum condition, resin (a) was injected from resin injection port 44 using a resin injecting device (not shown). After it was confirmed by observation that bubbles with a size more than φ2 mm were not contained in the resin discharged from resin discharge port 45, the resin discharge port 45 was closed, and succeedingly, the resin injection port 44 was closed. The injection pressure given to the resin at that time was 0.75 MPa at maximum.

After this condition was held for 15 minutes, the mold was opened to obtain a molded product. After the obtained molded product was cooled at 25° C., the thickness of the molded product was measured by a micrometer at a position inside by 15 mm from the edge of the molded product at each portion of the respective corner portions and the central portions of the respective sides, totally 8 portions, and as a result, the average thickness was about 2.1 mm.

Next, the surface of the obtained molded product was polished by a #600 sanding paper, and after it was degreased by acetone, it was applied with a primer for FRP (produced by Musashi Holt Co., Ltd.) and dried at a room temperature for one hour. Thereafter, while a light of a fluorescent lamp was irradiated to the surface of the molded product, the number of pinholes having a diameter more than φ0.2 mm on the surface was counted by observation, and as a result, there were no such pinholes. Further, when the product was cut out and the thicknesses of the respective layers were measured, the average thickness of the substrate 51c for the resin distribution medium layer was about 1.1 mm.

Example 2

A molded product was obtained in a manner similar to that in Example 1 other than a condition where the structures of the respective reinforcing fiber substrates were set as follows:
  Surface layer forming substrate 51a:
    substrate (b') (0°/90° fiber orientation)×1 ply
  Substrate for interlayer 51b:
    substrate (c') (0°/90° fiber orientation)×1 ply
  Substrate for resin distribution medium layer 51c:
    substrate (f)×1 ply
  Reinforcing fiber substrate 51d:
    substrate (c') (0°/90° fiber orientation)×2 ply The coefficients of impregnation of the respective substrates at that time were as follows:
  Coefficient of impregnation K of substrate (b')=$0.66 \times 10^{-10}$ m$^2$
  Coefficient of impregnation K of substrate (f)=$3.1 \times 10^{-10}$ m$^2$
  Coefficient of impregnation K of substrate (c')=$0.63 \times 10^{-10}$ m$^2$ Therefore, the ratio of the coefficients of impregnation at that time was 4.7. The thickness of the molded product obtained was measured by a micrometer at a position inside by 15 mm from the edge of the molded product at each portion of the respective corner portions and the central portions of the respective sides, totally 8 portions, and as a result, the average thickness was about 2.2 mm.

Next, after the molded product was surface treated in a manner similar to that in Example 1, when the number of pinholes having a diameter more than φ0.2 mm on the surface was counted by observation while a light of a fluorescent lamp was irradiated to the surface of the molded product, there were no such pinholes. Further, when the product was cut out and the thicknesses of the respective layers were measured, the thickness of the substrate 51c for the resin distribution medium layer was about 1.0 mm.

Example 3

A molded product was obtained in a manner similar to that in Example 1 other than a condition where the structures of the respective reinforcing fiber substrates were set as follows:
  Surface layer forming substrate 51a:
    substrate (h) (0°/90° fiber orientation)×1 ply
  Substrate for interlayer 51b:
    substrate (b) (0°/90° fiber orientation)×2 ply
  Substrate for resin distribution medium layer 51c:
    substrate (g)×1 ply
  Reinforcing fiber substrate 51d:
    substrate (h) (0°/90° fiber orientation)×1 ply The coefficients of impregnation of the respective substrates at that time were as follows:
  Coefficient of impregnation K of substrate (h)=$0.58 \times 10^{-10}$ m$^2$
  Coefficient of impregnation K of substrate (g)=$2.3 \times 10^{-10}$ m$^2$
  Coefficient of impregnation K of substrate (c)=$0.62 \times 10^{-10}$ m$^2$ Therefore, the ratio of the coefficients of impregnation at that time was 4.0. The thickness of the molded product obtained was measured by a micrometer at a position inside by 15 mm from the edge of the molded product at each portion of the respective corner portions and the central portions of the respective sides, totally 8 portions, and as a result, the average thickness was about 2.2 mm.

Next, after the molded product was surface treated in a manner similar to that in Example 1, when the number of pinholes having a diameter more than φ0.2 mm on the surface was counted by observation while a light of a fluorescent lamp was irradiated to the surface of the molded product, there were no such pinholes. Further, when the product was cut out and the thicknesses of the respective layers were measured, the thickness of the substrate 51c for the resin distribution medium layer was about 0.9 mm.

Example 4

Figure 7:
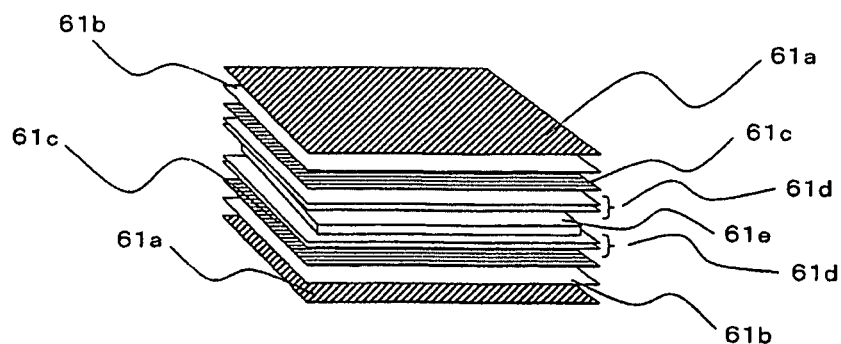
FIG. 7 is a schematic perspective view showing a lamination structure of substrates used in Example 4.

A molded product was obtained in a manner similar to that in Example 1 other than a condition where the structures of the respective reinforcing fiber substrates were set as shown in FIG. 7:
  Surface layer forming substrate 61a:
    substrate (a) (0°/90° fiber orientation)×1 ply
  Substrate for interlayer 61b:
    substrate (a) (0°/90° fiber orientation)×1 ply
  Substrate for resin distribution medium layer 61c:
    substrate (f)×1 ply
  Reinforcing fiber substrate 61d:
    substrate (f)×1 ply
  Core material 61e: core material (a)

Figure 8:
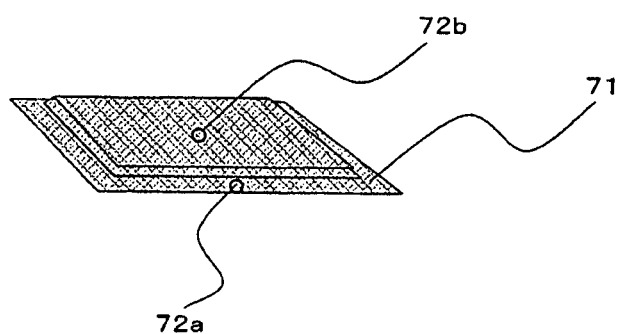
FIG. 8 is a schematic perspective view showing an example of a molded product in the present invention.

The coefficients of impregnation of the respective substrates at that time were as follows:
  Coefficient of impregnation K of substrate (a)=$0.6\times10^{-10}$ m$^2$
  Coefficient of impregnation K of substrate (f)=$3.1\times10^{-10}$ m$^2$ Therefore, the ratio of the coefficients of impregnation at that time was 5.2. When the thickness of a central part 72a of the end portion of a molded product 71 shown in FIG. 8, which was obtained in a manner similar to that in Example 1, was measured, it was about 3.2 mm. Further, when the thickness of a central portion 72b was measured, it was about 9.3 mm.

Next, after the molded product was surface treated in a manner similar to that in Example 1, when the number of pinholes having a diameter more than φ0.2 mm on the surface was counted by observation while a light of a fluorescent lamp was irradiated to the surface of the molded product, there were no such pinholes. Further, when the product was cut out and the thicknesses of the respective layers were measured, the thicknesses of the reinforcing fiber substrates 61b and 61d at the central portion 72b were about 1.0 mm, respectively.

Comparative Example 1

A molded product was obtained in a manner similar to that in Example 1 other than a condition where the structures of the respective reinforcing fiber substrates were set as follows:
  Reinforcing fiber substrate 51a:
    substrate (a) (0°/90° fiber orientation)×1 ply
  Reinforcing fiber substrate 51b: substrate (d)×1 ply
  Reinforcing fiber substrate 51c:
    substrate (a) (0°/90° fiber orientation)×3 ply The coefficients of impregnation of the respective substrates at that time were as follows:
  Coefficient of impregnation K of substrate (a)=$0.6\times10^{-10}$ m$^2$
  Coefficient of impregnation K of substrate (d)=$1.3\times10^{-10}$ m$^2$ Therefore, the ratio of the coefficients of impregnation at that time was about 2.2. When the thickness of the molded product obtained was measured in a manner similar to that in Example 1, the average thickness was about 1.1 mm.

Next, after the molded product was surface treated in a manner similar to that in Example 1, when the number of pinholes having a diameter more than φ0.2 mm on the surface was counted by observation while a light of a fluorescent lamp was irradiated to the surface of the molded product, 21 pinholes were recognized on the reinforcing fiber substrate 51a side, and there were 31 pinholes on the reinforcing fiber substrate 51c side. Further, when the product was cut out and the thicknesses of the respective layers were measured, the average thickness of the substrate 51c for the resin distribution medium layer was about 0.03 mm.

INDUSTRIAL APPLICATIONS OF THE INVENTION

The process for producing a fiber reinforced resin according to the present invention can be suitably applied to, for example, outer plate members represented by a bonnet of an automobile and a cowl of a motorcycle, a top plate of a desk, a chair, etc., but the application is not limited thereto.

The invention claimed is:

1. A process for producing a fiber reinforced resin which comprises:
    placing in the following order at least a reinforcing fiber substrate, a resin distribution medium, an interlayer having a cover factor of 90%-100% and comprising at least one woven fabric and a substrate for a skin layer, wherein a ratio of (a) a coefficient of impregnation of the resin distribution medium to (b) a coefficient of impregnation of the substrate for the skin layer is 1.5-10, in a cavity of a mold, wherein a core material is on at least one surface side of said resin distribution medium, and a resin flowable substrate layer with a thickness of 50-2,000 μm is provided extending outward beyond at least an end portion of a resin injection side of said core material, wherein a coefficient of impregnation of said resin flowable substrate layer is $1\times10^{-10}$ m$^2$ or more,
    injecting a resin into said cavity, and
    curing said resin.

2. The process according to claim 1, wherein at least one end portion of said resin distribution medium is extended outwardly longer than at least one adjacent layer.

3. The process according to claim 1, wherein said coefficient of impregnation of said resin distribution medium is $1\times10^{-10}$ m$^2$ or more.

4. The process according to claim 1, wherein a thickness of said resin distribution medium is 200-2,000 μm.

5. The process according to claim 1, wherein said resin distribution medium is a mesh.

6. The process according to claim 1, further comprising processing a groove on at least one surface of said core material.

7. The process according to claim 2, wherein said coefficient of impregnation of said resin distribution medium is $1\times10^{-10}$ m$^2$ or more.

8. The process according to claim 2, wherein a thickness of said resin distribution medium is 200-2,000 μm.

9. The process according to claim 3, wherein a thickness of said resin distribution medium is 200-2,000 μm.

10. The process according to claim 2, wherein said resin distribution medium is a mesh.

11. The process according to claim 3, wherein said resin distribution medium is a mesh.

12. The process according to claim 4, wherein said resin distribution medium is a mesh.

* * * * *